3,318,923
PROCESS FOR THE PREPARATION OF $\Delta^{1,3,5(10)}$-TRIENES AND 3 - KETO-6-OXYGENATED-$\Delta^{5(10)}$-DEHYDRO INTERMEDIATES THEREFOR
Francisco Alvarez, Mexico City, Mexico, assignor to Syntex Corporation, Panama, Panama, a corporation of Panama
No Drawing. Filed July 13, 1964, Ser. No. 382,361
Claims priority, application Mexico, Oct. 25, 1963, 74,437
28 Claims. (Cl. 260—397.4)

This invention relates to novel cyclopentanopolyhydrophenanthrene derivatives, to processes for their preparation, and to processes for the conversion of said derivatives into other valuable cyclopentanopolyhydrophenanthrene derivatives.

More particularly, this invention relates, first of all, to novel $\Delta^{5(10)}$ - 6 - hydroxy-3-ketoestrenes and 6-acylates thereof represented by the general formula:

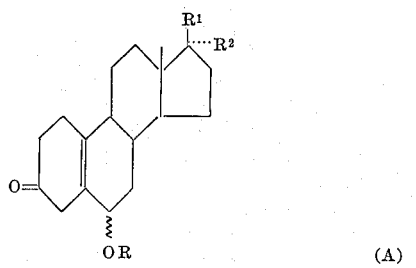

(A)

In the above formula R represents hydrogen or an acyl group containing less than 12 carbon atoms; $R^1$ represents a hydroxyl group or an acyloxy group containing less than 12 carbon atoms; $R^2$ represents hydrogen, a lower alkyl group, such as methyl, ethyl, propyl, butyl, hexyl, and the like, a lower alkenyl group, such as vinyl, allyl, and the like, or a lower alkynyl group, such as ethynyl, propynyl, hexynyl, and the like; $R^1$ and $R^2$ taken together can also represent a keto group, and the symbol ⌇ indicates that the hydroxyl or acyloxy group attached to the carbon atom in the 6-position of the steroid nucleus can be in either the α or the β-configuration.

The present invention also relates to novel 19-nor-$\Delta^{5(10)}$-6-hydroxy-3-ketopregnenes and 6-acylates thereof represented by the general formula:

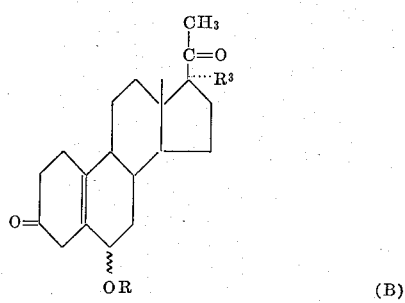

(B)

In the above formula R and the symbol ⌇ have the same meaning as set forth hereinabove and $R^3$ represents hydrogen, a hydroxyl group or an acyloxy group containing less than 12 carbon atoms.

The acyloxy and acyl groups referred to herein are preferably derived from hydrocarbon carboxylic acids containing less than 12 carbon atoms, which can be saturated or unsaturated, of straight, branched, cyclic or cyclic-aliphatic chain, or aromatic, and can either be unsubstituted or substituted with functional groups such as hydroxy groups, alkoxy groups containing up to 5 carbon atoms, acyloxy groups containing up to 12 carbon atoms, nitro groups, amino groups or halogen atoms.

Included among such acyloxy and acyl groups are those derived from acetic, t-butylacetic, trimethylacetic, phenoxyacetic, aminoacetic, propionic, cyclopentylpropionic, β-chloropropionic, butyric, enanthic, benzoic, and succinic acid, and the like.

The present invention further relates to processes for the conversion of these $\Delta^{5(10)}$-6-hydroxy- and 6-acyloxy-3-keto-steroids, the 3-ketals thereof, and related compounds, into the corresponding $\Delta^{1,3,5(10)}$-3-hydroxy steroids or 3-esters and 3-lower alkyl ethers thereof, which processes can be illustrated schematically as follows, using, for the sake of simplicity, only the A and B rings of the steroid nucleus:

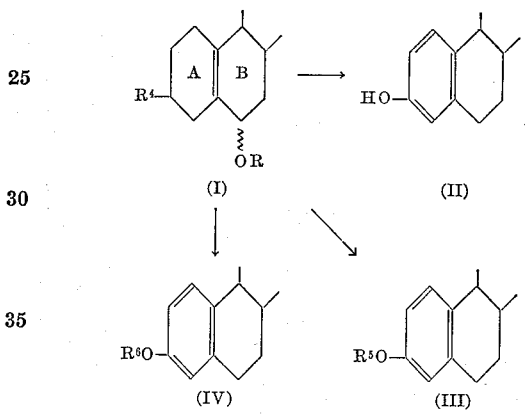

In these partial formulas R and the symbol ⌇ have the same meaning as set forth hereinabove, $R^4$ represents a keto group or a ketalized keto group, e.g., a lower alkylidenedioxy group, such as an ethylenedioxy group, $R^5$ represents a lower alkyl group and $R^6$ represents an acyl group containing less than 12 carbon atoms.

The starting material (I) employed in the novel process of the present invention can contain other non-interfering substituents in addition to the substituents shown at the 3- and 6-positions in partial formula (I) and in addition to the conventional substituents found in the 17-position in androstane derivatives, such as the 17-substituents represented by $R^1$ and $R^2$ in Formula I hereinabove, a ketalized 17-keto group, and the like, and in addition to the usual 16, 17, 20 and 21-substituents of pregnane derivatives, e.g., the 17β-acetyl side chain, with or without a 17α-hydroxyl or acyloxy group, as shown in Formula II hereinabove, a 17β-acetyl side chain having a ketalized 20-keto group, a dihydroxy acetone side chain wherein the hydroxyl groups are either free or functionally converted, e.g., one wherein the hydroxyl groups have been esterified or wherein the entire side chain has been converted to a bismethylenedioxy derivative, a 16-hydroxyl group, and the like. Included among such substituents are keto groups or derivatives thereof, such as enol ether or ketal derivatives, hydroxyl groups or derivatives thereof, such as ester, ether, acetal or ketal derivatives, alkyl groups, such as methyl, ethyl or propyl groups, halogen atoms, such as fluorine or chlorine, and the like, which, depending on the particular substituent, can be present at one or more of positions 1, 2, 4, 7, 8, 9, 11, 12, 14, 15, 16, 18, 20 and 21 on the steroid nucleus.

In carrying out each of the above-illustrated processes (I→II, I→III and I→IV), the starting material I is treated with a proton donor other than water at a temperature ranging from room temperature (about 25° C.) or lower to about 100° C., and preferably at a temperature of from about 70° C. to about 80° C., for from about 5 hours or less to about 48 hours or longer. Parenthetically, it should be noted here that if higher or lower reaction temperatures coupled with shorter or longer reaction times are employed, only the rate of the reaction will be affected. Thus, the reaction conditions given hereinabove are not critical, but merely represent the best mode of carrying out the invention known at the present time.

Preferred proton donors include weak and strong organic acids, such as acetic acid, oxalic acid, trichloroacetic acid, methanesulfonic acid, benzenesulfonic acid, p-toluenesulfonic acid, and the like and mineral acids, such as hydrochloric acid, sulfuric acid, nitric acid, perchloric acid, boric acid, phosphorous acid, phosphoric acid, and the like.

The proton donor will generally be used in trace amounts, e.g., one or two drops of the proton donor or a solution thereof, such as an aqueous 70% perchloric acid solution, since only a catalytic amount sufficient to enolize the 3-keto group in the steroid starting material is required. However, larger quantities of the proton donor can also be employed, and, up to a point, the use of larger amounts of the proton donor will accelerate the reaction rate. In addition, in certain cases the proton donor, or solutions thereof, can be the sole solvent for the reaction.

If the starting steroid I is contacted with the proton donor alone, or in water or in an inert organic solvent, e.g., a monoether such as diethyl ether diisopropyl ether, tetrahydrofuran or the like, a diether such as dioxane or the like, a ketone such as acetone, methyl ethyl ketone, diethyl ketone, methyl isobutyl ketone, or the like, or dimethyl sulfoxide, a di(lower)alkyl amide such as dimethyl formamide, dimethyl acetamide, or the like, a halogenated hydrocarbon such as methylene chloride, ethylene dichloride, or the like, as well as mixtures thereof, the reaction will proceed in the direction I→II, i.e., a $\Delta^{1,3,5(10)}$-3-hydroxy steroid II will be produced and acid-sensitive groupings in the molecule, such as enol ether, thioether, tetrahydropyranyl ether and ketal groups, and the like, will be hydrolyzed. For example, a 17- or 20-ketal group will be hydrolyzed to the corresponding free keto group.

The starting steroid can also be contacted with the proton donor in the presence of a lower alkanol, such as methanol, ethanol, propanol, n-amylol, or the like, or a substance which, in acid medium, provides a lower alkanol, e.g., a lower alkyl orthoformate, such as methyl or ethyl orthoformate, or the like, or a lower alkane containing at least three carbon atoms which is substituted on a non-terminal carbon atom thereof with two lower alkoxy groups, e.g., 2,2-dimethoxypropane, 2,2-dimethoxybutane, 3,3-diethoxypentane, or the like, or a mixture of a lower alkanol and a substance which, in acid medium, provides a lower alkanol. One or more inert organic solvents or diluents, e.g., those mentioned hereinabove, can also be present.

In this case, the reaction will proceed in the direction I→III, i.e., a $\Delta^{1,3,5(10)}$-3-lower alkoxy steroid III, wherein the lower alkoxy group corresponds to that of the lower alkanol present, will be obtained, and while acid-sensitive groupings in the molecule will be hydrolyzed, just as in the case where no lower alkanol is present, other etherifiable groups in the molecule can be etherified at the same time, depending on the alkanol present and its source. For example when $\Delta^{5(10)}$-estren-6α-ol-3,17-dione 6-acetate is heated with ethyl orthoformate in the presence of a catalytic amount of sulfuric acid, preferably under substantially anhydrous conditions, the 17-diethyl ketal of estrone 3-ethyl ether is produced. However, if this reaction is carried out in the presence of 2,2-dimethoxypropane, rather than ethyl orthoformate, estrone 3-methyl ether, unetherified at the 17-position, is obtained.

Ordinarily, the lower alkanol will be used in amounts ranging from about 1 to about 10 times, and preferably from about 5 times to about 7 times, the weight of the steroid starting material, or an amount of a substance which, in acid medium, provides a lower alkanol, sufficient to give the required amount of lower alkanol, will be employed.

Finally, the starting steroid can also be reacted in the presence of either an anhydride of an organic carboxylic acid containing less than 12 carbon atoms, and preferably an anhydride of a hydrocarbon carboxylic acid of the type referred to hereinabove, such as acetic anhydride, propionic anhydride, butyric anhydride, succinic anhydride, and the like, or an enol ester of an organic carboxylic acid containing less than 12 carbon atoms with a lower alkanone, said enol ester having the general formula:

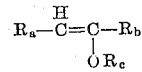

wherein $R_a$ and $R_b$ each represent hydrogen or a lower alkyl group, with at least one of $R_a$ and $R_b$ being lower alkyl, and $R_c$ represents an acyl group containing less than 12 carbon atoms, such as isopropenyl acetate, isopropenyl propionate, isopropenyl butyrate, isobutenyl acetate, and the like. One more inert organic solvents or diluents, e.g., those mentioned hereinabove, can also be present.

In this case, the reaction proceeds in the direction I→IV, i.e., a $\Delta^{1,3,5(10)}$-3-acyloxy steroid D, wherein the acyloxy group corresponds to that of the anhydride or enol ester present will be produced, and while acid-sensitive groupings in the molecule will also be hydrolyzed in this case, other esterifiable groups in the molecule, such as primary or secondary hydroxyl groups, enolizable keto groups, e.g., at the 17-position, and the like, can be esterified.

Ordinarily, the anhydride will be used in amounts ranging from about 1 to about 10 molar equivalents, and preferably from about 2 to about 4 molar equivalents, per equivalent of steroid starting material, while the enol acylate will usually be employed in amounts ranging from about 1 to about 10 molar equivalents, and preferably from about 5 to about 8 molar equivalents, per equivalent of steroid starting material.

In addition to being valuable starting materials for the above-described process, the novel $\Delta^{5(10)}$-6-hydroxy-3-ketoestrenes, $\Delta^{5(10)}$-6-hydroxy-3-ketopregnenes and 6-acylates thereof of the present invention also have useful pharmacological properties. Thus, the $\Delta^{5(10)}$-6-hydroxy-3-ketoestrenes and 6-acylates thereof of Formula A hereinabove wherein $R^2$ is other than a lower alkynyl group are anabolic-androgenic agents having a favorable anabolic/androgenic ratio. In addition, they have anti-estrogenic, anti-gonadotrophic, anti-fibrillatory and appetite stimulating properties, lower blood cholesterol levels, relieve premenstrual tension and suppress the output of the pituitary gland. Similarly, the $\Delta^{5(10)}$-6-hydroxy-3-ketoestrenes of Formula A hereinabove wherein $R^2$ represents a lower alkynyl group, the $\Delta^{5(10)}$-6-hydroxy-3-ketopregnenes of Formula B hereinabove, and the 6-acylates thereof are progestational agents having anti-estrogenic, anti-androgenic, anti-gonadotrophic and diuretic properties. They are also useful in fertility control, in the treatment of premenstrual tension, and for lowering blood cholesterol levels.

These novel $\Delta^{5(10)}$-6-hydroxy-3-ketoestrenes, $\Delta^{5(10)}$-6-hydroxy-3-ketopregnenes and 6-acylates thereof can be obtained from the corresponding $\Delta^5$-3$\beta$,19-diols, which are themselves obtained as described in U.S. Patent No. 3,065,228 to Bowers, by a method which can be illustrated schematically as follows, again using, for the sake of simplicity, only the A and B rings of the steroid nucelus:

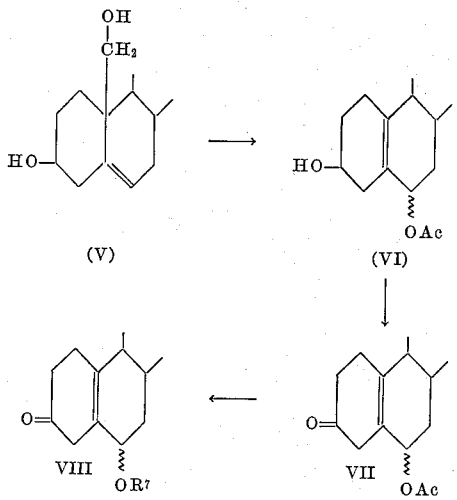

In these partial formulas the symbol $\xi$ has the same meaning as set forth hereinabove, Ac represents an acetyl group and R⁷ represents hydrogen or an acyl group, other than acetyl, containing less than 12 carbon atoms.

In carrying out this method, the $\Delta^5$-3$\beta$,19-dihydroxy starting steroid (V), dissolved in an inert organic solvent, such as benzene, toluene, xylene, carbon tetrachloride, or the like (is reacted with from about 1 to about 2 equivalents, and preferably from about 1.05 to about 1.1 equivalents, per equivalent of steroid, of lead tetraacetate, either alone or together with a buffering amount of an alkali metal carbonate or alkaline earth metal carbonate, such as sodium carbonate, calcium carbonate, and the like, at the temperature of from about 50° C. to about 100° C., and preferably at from about 65° C. to about 75° C., for from about 10 minutes to about 1 hour, to produce a mixture of the corresponding $\Delta^{5(10)}$-3$\beta$,6$\alpha$-diol 6-acetate and $\Delta^{5(10)}$-3$\beta$,6$\beta$-diol 6-acetate (VI).

Next, the 3$\beta$-hydroxyl groups in these $\Delta^{5(10)}$-steroids are oxidized to give a mixture of the corresponding $\Delta^{5(10)}$-6$\alpha$-ol-3-one 6-acetate and $\Delta^{5(10)}$-6$\beta$-ol-3-one 6-acetate (VII), which can be separated into the individual isomers at this point by careful chromatography, e.g., using neutral alumina, or used as such as the starting material for the next step. This oxidation reaction is preferably carried out in an inert organic solvent, e.g., an ether such as dioxane or tetrahydrofuran, a ketone such as acetone, or the like, using Jones' reagent (8N chromic acid in sulfuric acid) at a temperature of from about $-10°$ C. to about 25° C., and preferably at from about $-5°$ C. to about 0° C., for from 15 minutes to about 1 hour.

When the free 6-hydroxy compounds (VIII: R⁷=hydrogen) are desired, the mixture of $\Delta^{5(10)}$-6$\alpha$-ol-3-one 6-acetate and $\Delta^{5(10)}$-6$\beta$-ol-3-one 6-acetate (VII) is hydrolyzed in known manner, e.g., using an aqueous 1% solution of potassium hydroxide, sodium hydroxide, or the like, at a temperature of from about 20° C. to about 80° C. The resulting mixture of free 6-hydroxy compounds can then be separated chromatographically.

These 6-hydroxy compounds can be reesterified, either separately or in admixture, by conventional procedures, e.g., by reaction with a chloride or anhydride of an acid of the type referred to hereinabove, in the presence of pyridine, to produce the corresponding $\Delta^{5(10)}$-6$\alpha$-ol-3-one 6-acylate and $\Delta^{5(10)}$-6$\beta$-ol-3-one 6-acylate (VIII; R⁶≠hydrogen) which, in the case of a mixture, can then be separated chromatographically.

An illustrative but by no means exhaustive listing of $\Delta^5$-3$\beta$,19-dihydroxy steroid starting materials which can be employed to prepare the corresponding $\Delta^{5(10)}$-6-ol-3-ones and their 6-acylates includes:

$\Delta^5$-androstene-3$\beta$,19-diol-17-one, $\Delta^5$-androstene-3$\beta$,17$\beta$,19-triol, 7$\alpha$-methyl - $\Delta^5$ - androstene-3$\beta$,17$\beta$,19-triol,17$\alpha$-ethyl-$\Delta^5$-androstene-3$\beta$,17$\beta$,19-triol, 17$\alpha$ - vinyl-$\Delta$-androstene-3$\beta$,17$\beta$,9-triol, 17$\alpha$-ethynyl-$\Delta^5$-androstene-3$\beta$,17$\beta$,19-triol, $\Delta^5$-pregnene-3$\beta$,19-diol-20-one, 16$\alpha$-methyl-$\Delta^5$-pregnene-3$\beta$,19-diol-20-one-16$\beta$-methyl - $\Delta^5$ - pregnene-3$\beta$,19-diol-20-one, $\Delta^5$-pregnene-3$\beta$,17$\alpha$,19-triol-20-one, $\Delta^5$-pregnene-3$\beta$,19-diol-20-one, 16$\beta$-methyl - $\Delta^5$ - pregnene-3$\beta$,19-pregnene-3$\beta$,17$\alpha$,19-triol-20-one-17 - acetate, 16$\alpha$,17$\alpha$-isopropylidenedioxy-$\Delta^5$-pregnene-3$\beta$,19-diol-20-one, 17,20;20,21-bismethylenedioxy-$\Delta^5$-pregnene - 3$\beta$,19 - diol, 17,20;20,21-bismethylenedioxy-$\Delta^5$-pregnene-3$\beta$,19-diol-11-one, and the like.

A 17$\alpha$-lower alkyl, lower alkenyl or lower alkynyl substituent can also be introduced in known manner either after the aforementioned lead tetraacetate reaction (V→VI) or after the ring A aromatization reaction (I→II, I→III, or I→IV). Thus, for example, the corresponding 17-keto compound can be reacted with a lower alkyl, lower alkenyl or lower alkynyl magnesium halide, e.g., methyl, vinyl or ethynyl magnesium bromide, in an inert organic solvent such as benzene or the like. The 17-keto steroid can also be reacted with acetylene or the like in the presence of potassium t-amylate and t-amyl alcohol or with an alkoxy alkyne, e.g., ethoxyacetylene, in the presence of an alkyl magnesium halide, e.g., ethyl magnesium bromide, to give the corresponding 17$\alpha$-alkynyl-17$\beta$-hydroxy or alkoxy derivatives directly. Where compounds having a 17$\alpha$-lower alkenyl substituent are desired, the 17$\alpha$-lower alkynyl substituent can be reduced to a 17$\alpha$-lower alkenyl group, e.g., by dissolving the 17$\alpha$-lower alkynyl steroid in an inert organic solvent such as pyridine, collidine, lutidine or the like, and hydrogenating at atmospheric pressure and room temperature with hydrogen gas, preferably in the presence of a hydrogenation catalyst such as pre-hydrogenated palladized calcium carbonate or platinum- or palladium-on-charcoal, until approximately one molar equivalent of hydrogen has been absorbed. Similarly, compounds having a 17$\alpha$-lower alkyl substituent containing two or more carbon atoms can be prepared by hydrogenating the corresponding 17$\alpha$-lower alkynyl steroid at atmospheric pressure and room temperature in dioxane, tetrahydrofuran, or the like and in the presence of hydrogenation catalyst, e.g., one of those referred to hereinabove, until two molar equivalents of hydrogen have been absorbed.

The $\Delta^{5(10)}$-3$\beta$,6-diol-6-acetate (VI) used in the above-described method of preparing the novel $\Delta^{5(10)}$-6-hydroxy-3-keto estrenes, -pregnenes and 6-acylates thereof of the present invention can also be prepared from the corresponding $\Delta^{5(10)}$-3$\beta$-hydroxy-6-ketoestrenes and $\Delta^{5(10)}$-3$\beta$-hydroxy-6-ketopregnenes, which are themselves obtained as described in copending U.S. patent applications Serial Nos. 236,724, filed November 9, 1962, and 293,891, filed July 9, 1963, by a process which can be illustrated schematically as follows, again using, for the sake of simplicity, only the A and B rings of the steroid nucleus:

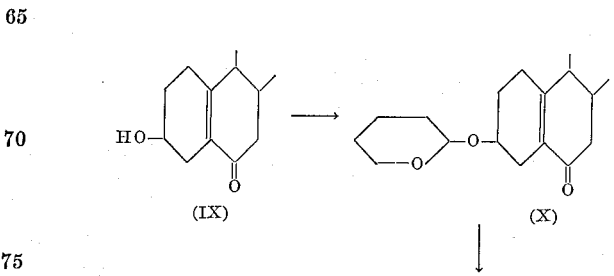

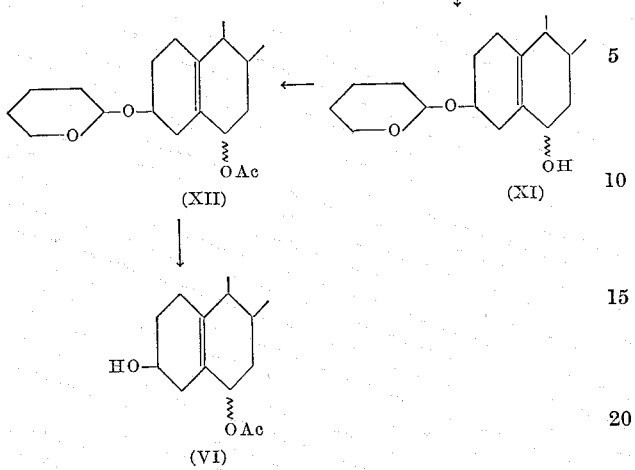

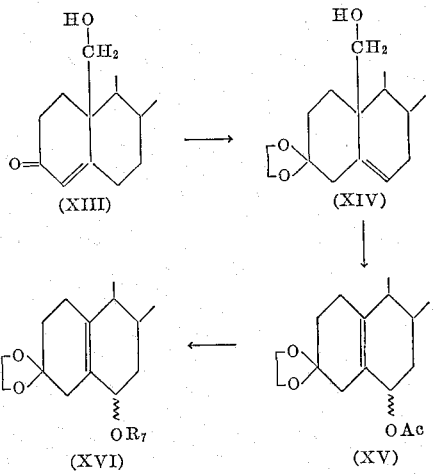

In these partial formulas the symbol ⌇ has the same meaning as set forth hereinabove and Ac represents an acetyl group.

In carrying out this process, the starting $\Delta^{5(10)}$-3β-hydroxy-6-keto steroid (IX) is first converted to the corresponding 3-tetrahydropyranyl ether (X). This reaction will be carried out under substantially anhydrous conditions, using an excess of dihydropyran, in the presence of a small amount of an acidic catalyst, e.g., hydrochloric acid, p-toluenesulfonic acid, boron trifluoride etherate, or the like, either alone or together with an inert organic solvent, such as benzene, diethyl ether, or the like, at a temperature of from about 0° C. to about 50° C., and preferably at room temperature (about 25° C.), for from about 1 hour to about 72 hours.

The 6-keto group in the resulting $\Delta^{5(10)}$-3β-tetrahydropyranyloxy-6-keto steroid (X) is then selectively reduced, using sodium borohydride, dissolved in a mixture of methanol and dioxane, at room temperature overnight, to give a mixture of the corresponding $\Delta^{5(10)}$-3β-tetrahydropyranyloxy-6α-hydroxy and $\Delta^{5(10)}$-3β-tetrahydropyranyloxy-6β-hydroxy compounds (XI), which can then be separated chromatographically if desired.

Keto groups present elsewhere in the molecule, e.g., at the 20-position in the pregnane side chain, will also be reduced during this reaction if not suitably protected, e.g., by ketalization. However, means of regenerating a keto group from a hydroxyl group are so well known in the art that this poses not particular problems.

These 6-hydroxy compounds (XI) can then be acetylated, either separately or in admixture, by conventional procedures, again, for example, by reaction with acetyl chloride or acetic anhydride, in the presence of pyridine, to produce the corresponding $\Delta^{5(10)}$-3β-tetrahydropyranyloxy-6α-ol-6-acetate- and $\Delta^{5(10)}$-3β-tetrahydropyranyloxy-6β-ol-6-acetate (XII) which, in the case of a mixture, can then be separated chromatographically.

Finally, the 3β-tetrahydropyranyloxy group in these 6-acetoxy compounds is hydrolyzed, e.g., by reaction with an aqueous mixture of acetic and hydrochloric acids at room temperature, to give the corresponding free 3β-hydroxy steroids (VI) which, in the case of a mixture, can then be separated chromatographically.

The $\Delta^{5(10)}$-6-hydroxyestrene 3-ketals, $\Delta^{5(10)}$-6-hydroxypregnene 3-ketals and 6-acylates thereof employed as starting materials in processes I→II, I→III and I→IV described hereinabove can be obtained from the corresponding $\Delta^{4}$-19-ol-3-ones, which are themselves obtained from the corresponding $\Delta^{5}$-3β,19-diols in the manner described in copending U.S. patent application Serial No. 201,802, filed June 12, 1962, now U.S. Patent No. 3,145,202, by a method which can be illustrated schematically as follows, using the 3-ethylene ketal groups as an example and again using, for the sake of simplicity, only the A and B rings of the steroid nucleus:

In these partial formulas the symbols ⌇, Ac and $R^7$ have the same meaning as set forth hereinabove.

In carrying out this process the $\Delta^{4}$-19-ol-3-one starting material (XIII) is reacted with an acid anhydride, e.g., acetic anhydride, in pyridine, preferably at room temperature overnight, to provide the corresponding 19-acylate, which is then ketalized in known manner, e.g., by refluxing in dioxolane, or in benzene with ethylene glycol, in the presence of a small amount of an acid catalyst, such as p-toluenesulfonic acid or the like, and finally de-acylated, e.g., by refluxing in methanolic potassium hydroxide, to give the corresponding $\Delta^{5}$-19-hydroxy 3-ketal derivatives (XIV).

The thus-obtained $\Delta^{5}$-19-hydroxy 3-ketal is then treated with lead tetraacetate in the same manner as was described for the $\Delta^{5}$-3β,19-dihydroxy steroids of formula (V) hereinabove to produce a mixture of the corresponding $\Delta^{5(10)}$-6α-ol 3-ketal 6-acetate and $\Delta^{5(10)}$-6β-ol 3-ketal 6-acetate (XV), which can then be separated chromatographically, if desired.

These 6-acyloxy 3-ketals can also be saponified to give the corresponding 6-hydroxy 3-ketals (XVI; $R^7$=hydrogen), e.g., by dissolving or suspending them in a lower alkanol, such as methanol or ethanol, and then refluxing with aqueous potassium carbonate. The resulting 6-hydroxy 3-ketals can then be reesterified, either separately or in admixture, by conventional procedures, e.g., by reaction with a chloride or anhydride of an acid of the type referred to hereinabove, in the presence of pyridine, to produce the corresponding $\Delta^{5(10)}$-6α-ol 3-ketal 6-acylate and $\Delta^{5(10)}$-6β-ol 3-ketal 6-acylate (XVI; R≠hydrogen), which in the case of a mixture, can then be separated chromatographically.

An illustrative but by no means exhaustive listing of $\Delta^{4}$-19-hydroxy-3-keto steroids which can be employed to prepare the corresponding $\Delta^{5(10)}$-6-hydroxy 3-ketals and 6-acylates thereof used as starting materials in processes I→II, I→III, and I→IV includes:

$\Delta^{4}$-androsten-19-ol-3,17-dione, 17α-methyl-$\Delta^{4}$-androstene-17β,19-diol-3-one, 17α-vinyl-$\Delta^{4}$-androstene-17β,19-diol-3-one, 17α-ethynyl-$\Delta^{4}$-androstene-17β,19-diol-3-one, 17α-ethynyl-$\Delta^{4}$-androstene-17β,19-diol-3-one 17-acetate, $\Delta^{4}$-pregnen-19-ol-3,20-dione, 16α-methyl-$\Delta^{4}$-pregnen-19-ol-3,20-dione, 16β-methyl-$\Delta^{4}$-pregnen-19-ol-3,20-dione, 16α,17α-isopropylidenedioxy-$\Delta^{4}$-pregnen-19-ol-3,20-dione, $\Delta^{4}$-pregnene-17α,19-diol-3,20-dione 17-acetate, 17,20; 20, 21-bismethylenedioxy-$\Delta^{4}$-pregnen-19-ol-3,11-dione, and the like.

In order that those skilled in the art can more fully understand the present invention, the following examples are set forth. These examples are given solely for the purpose of illustrating the invention and should not be considered as expressing limitations unless so set forth in the appended claims:

*Preparation A*

To a solution of 5 grams of $\Delta^5$-androstene-3$\beta$,19-diol-17-one in 250 cc. of thiophene-free benzene there was added 27.5 cc. of 4 N methyl-magnesium bromide in diethyl ether. The resulting reaction mixture was then refluxed, excluding moisture, for 3 hours, and then cooled to room temperature. The cooled mixture was cautiously treated with an excess of aqueous ammonium chloride solution and then extracted with ethyl acetate. The extract was washed with water, dried over anhydrous sodium sulfate, and evaporated to dryness. Crystallization from methylene chloride/hexane gave 17$\alpha$-methyl-$\Delta^5$-androstene-3$\beta$,17$\beta$,19-triol.

*Preparation B*

A solution of 10 molar equivalents of ethyl lithium in 50 cc. of diethyl ether was added dropwise, with stirring, to a solution of 2 grams of $\Delta^5$-androstene-3$\beta$,19-diol-17-one in 250 cc. of anhydrous diethyl ether, contained under a nitrogen atmosphere. The resulting reaction mixture was then allowed to stand, with stirring, at room temperature for 48 hours. Following this reaction period the reaction mixture was poured into water, acidified with hydrochloric acid and then stirred vigorously for 1 hour. Next, the ether layer was separated, washed with water until neutral, dried over anhydrous sodium sulfate, filtered, and evaporated to dryness. Recrystallization of the resulting residue from acetone/hexane gave 17$\alpha$-ethyl-$\Delta^5$-androstene-3$\beta$,17$\beta$,19-triol.

*Preparation C*

A solution of 1 gram of $\Delta^5$-androstene-3$\beta$,19-diol-17-one in 30 cc. of anhydrous benzene was added to a solution prepared by dissolving 1.4 grams of potassium in 30 cc. of t-amyl alcohol, contained under a nitrogen atmosphere, and a slow current of purified acetylene was then passed through the resulting solution for 40 hours. Following this reaction period the solution was diluted with water and extracted with benzene. The extract was then washed with water until neutral, dried over anhydrous sodium sulfate and evaporated to dryness. Chromatography of the resulting residue on alkaline alumina gave, in the hexane/benzene (2:3, respectively) fractions a product which, upon recrystallization from acetone/hexane, gave pure 17$\alpha$-ethynyl-$\Delta^5$-androstene-3$\beta$,17$\beta$,19-triol.

*Preparation D*

A solution of 1 gram of 17$\alpha$-ethynyl-$\Delta^5$-androstene-3$\beta$,17$\beta$,19-triol in 40 cc. of pyridine was hydrogenated, at 25° C. and atmospheric pressure in the presence of 400 mg. of pre-hydrogenated palladized calcium carbonate hydrogenation catalyst, until 1.1 molar equivalents of hydrogen had been absorbed. At this point, the reaction was stopped and the catalyst separated by filtration through Celite and washed with ethyl acetate. The washings were then combined with the filtrate and the combined solution evaporated to dryness under vacuum, thus giving the crude vinyl derivative. This crude product was then dissolved in ethyl acetate, washed with dilute hydrochloric acid and then with water until neutral, dried over anhydrous sodium sulfate and evaporated to dryness. Recrystallization of the resulting residue from acetone gave pure 17$\alpha$-vinyl-$\Delta^5$-androstene-3$\beta$,17$\beta$,19-triol.

*Preparation E*

To a solution of 1 gram of $\Delta^{5(10)}$-estren-3$\beta$-ol-6,17-dione in 25 cc. of benzene there was added 2 cc. of dihydropyran. Next, approximately 5 cc. of the mixture of benzene and dihydropyran was distilled off to remove moisture, and the remaining mixture was then cooled to room temperature. To the cooled mixture there was then added 0.1 gram of p-toluenesulfonic acid, and the resulting reaction mixture was held at room temperature for 72 hours. Following this reaction period the reaction mixture was washed with an aqueous 5% sodium carbonate solution and then with water until neutral, then dried over anhydrous sodium sulfate and evaporated to dryness. The dry residue was then chromatographed by passing it dissolved in hexane, through a column of neutral alumina, thus giving the 3-tetrahydropyranyl ether of $\Delta^{5(10)}$-estren-3$\beta$-ol-6,17-dione (3$\beta$-tetrahydropyranyloxy-$\Delta^{5(10)}$-estrene-6,17-dione).

By repeating this procedure in every detail but one, namely, replacing $\Delta^{5(10)}$-estren-3$\beta$-ol-6,17-dione with 19-nor-$\Delta^{5(10)}$-pregnen-3$\beta$-ol-6,20-dione, the corresponding-3-tetrahydropyranyl ether, namely, 3$\beta$-tetrahydropyranyloxy-19-nor-$\Delta^{5(10)}$-pregnene-6,20-dione, was obtained.

A solution of 2 grams of sodium borohydride in 6 cc. of water was added to an ice-cold solution of 1 gram of the 3-tetrahydropyranyl ether of $\Delta^{5(10)}$-estren-3$\beta$-ol-6,17-dione in 120 cc. of methanol, and the resulting reaction mixture was then allowed to stand at room temperature for 16 hours. Following this reaction period the reaction mixture was treated with acetic acid to decompose excess borohydride and then concentrated to a small volume under reduced pressure and diluted with water. The dilute solution was then extracted with ethyl acetate, and the extract was washed with water, dried over anhydrous sodium sulfate and evaporated to dryness. The resulting residue was crystallized from acetone/hexane to give a mixture of 3$\beta$-tetrahydropyranyloxy-$\Delta^{5(10)}$-estrene-6$\alpha$,17$\beta$-diol and 3$\beta$-tetrahydropyranyloxy-$\Delta^{5(10)}$-estrene-6$\beta$,17$\beta$-diol.

By repeating this procedure in every detail but one, namely, replacing the 3-tetrahydropyranyl ether of $\Delta^{5(10)}$-estren-3$\beta$-ol-6,17-dione with 3$\beta$-tetrahydropyranyloxy-19-nor-$\Delta^{5(10)}$-pregnene-6,20-dione, a mixture of 3$\beta$-tetrahydropyranyloxy-19-nor-$\Delta^{5(10)}$-pregnene-6$\alpha$,20$\epsilon$-diol and 3$\beta$-tetrahydropyranyloxy-19-nor-$\Delta^{5(10)}$-pregnene-6$\beta$,20$\epsilon$-diol was obtained.

One gram of the above-prepared mixture of 3$\beta$-tetrahydropyranyloxy-$\Delta^{5(10)}$-estrene-$\alpha$,17$\beta$-diol and 3$\beta$-tetrahydropyranyloxy-$\Delta^{5(10)}$-estrene-6$\beta$,17$\beta$-diol was admixed with 8 cc. of pyridine and 4 cc. of acetic anhydride, and the resulting reaction mixture was allowed to stand at room temperature overnight. Following this reaction period the reaction mixture was poured into ice water, and the thus-formed precipitate was filtered, washed with water and dried. Crystallization from acetone/hexane gave a mixture of 3$\beta$-tetrahydropyranyloxy-$\Delta^{5(10)}$-estrene-6$\alpha$,17$\beta$-diol 6,17-diacetate and 3$\beta$-tetrahydropyranyloxy-$\Delta^{5(10)}$-estrene-6$\beta$,17$\beta$-diol 6,17-diacetate.

By repeating this procedure in every detail but one, namely, using the above-prepared mixture of 3$\beta$-tetrahydro-pyranyloxy-19-nor-$\Delta^{5(10)}$-pregnene-6$\alpha$,20$\epsilon$-diol and 3$\beta$-tetrahydropyranyloxy-19-nor-$\Delta^{5(10)}$-pregnene-6$\beta$,20$\epsilon$-diol as the steroid starting material, the corresponding 6,20-diacetates were obtained.

To a solution of 1 gram of the above-prepared mixture of 3$\beta$-tetrahydropyranyloxy-$\Delta^{5(10)}$-estrene-6$\alpha$,17$\beta$-diol 6,17-diacetate and 3$\beta$-tetrahydropyranyloxy-$\Delta^{5(10)}$-estrene-6$\beta$,17$\beta$-diol 6,17-diacetate in 30 cc. of acetic acid there was added 0.5 cc. of aqueous 2 N hydrochloric acid, and the resulting reaction mixture was allowed to stand at room temperature for 5 hours. Following this reaction period the reaction mixture was diluted with ice water and then extracted with methylene chloride. The extract was washed with water until neutral, then dried over anhydrous sodium sulfate and evaporated to dryness. Crystallization from acetone/hexane gave a mixture of $\Delta^{5(10)}$-estrene-3$\beta$,6$\alpha$,17$\beta$-triol 6,17-diacetate and $\Delta^{5(10)}$-estrene-3$\beta$,6$\beta$,17$\beta$-triol 6,17-diacetate, which was then chromatographed on neutral alumina to give the individual isomers.

By repeating this procedure in every detail but one, namely, using the above-prepared mixture of 3$\beta$-tetrahydro-pyranyloxy-19-nor-$\Delta^{5(10)}$-pregnene-6$\alpha$,20$\epsilon$-diol 6,20 - diacetate and 3β - tetrahydropyranyloxy - 19 - nor-Δ$^{5(10)}$-pregnene-6β,20ε-diol 6,20-diacetate as the steroid starting material, the corresponding free 3β-ols, i.e., 19-nor-Δ$^{5(10)}$pregnene-3β,6α,20ε-triol 6,20-diacetate and 19-nor-Δ$^{5(10)}$-pregnene-3β,6β,20ε-triol 6,20-diacetate, were separately obtained.

Preparation F

A mixture of 1 gram of Δ$^4$-androsten-19-ol-3,17-dione, 4 cc. of pyridine and 2 cc. of acetic anhydride was allowed to stand at room temperature overnight. Following this reaction period the reaction mixture was poured into ice water, and the thus-formed precipitate was filtered, washed with water and dried. Crystallization from acetone/hexane gave Δ$^4$-androsten-19-ol-3,17-dione 19-acetate.

By repeating this procedure in every detail but one, namely, replacing Δ$^4$-androsten-19-ol-3,17-dione with 17α - methyl - Δ$^4$ - androstene - 17β,19 - diol - 3 - one, 17α - ethynyl - Δ$^4$ - androstene - 17β,19 - diol - 3 - one, Δ$^4$-pregnene-19-ol-3,20-dione and Δ$^4$-pregnene-17α,19-diol-3,20-dione 17-acetate, the corresponding 19-acetates were obtained.

A mixture of 1 gram of Δ$^4$-androsten-19-ol-3,17-dione 19-acetate, 50 cc. of anhydrous benzene, 10 cc. of ethylene glycol and 50 mg. of p-toluenesulfonic acid was refluxed for 16 hours using a water separator. Following this reaction period the reaction mixture was washed with an aqueous sodium bicarbonate solution and then with water, dried over anhydrous sodium sulfate and evaporated to dryness. Crystallization from acetone/hexane gave 3,17-bis(ethylenedioxy)-Δ$^5$-androsten - 19 - ol 19-acetate.

This procedure was then repeated using the remaining 19-acetates prepared as described hereinabove to give 3 - ethylenedioxy - 17α - methyl - Δ$^5$ - androstene - 17β,19-diol 19-acetate, 3-ethylenedioxy-17α-ethynyl-Δ$^5$androstene-17β,19-diol 19-acetate, 3,20-bis(ethylenedioxy)-Δ$^5$-pregnen-19-ol 19-acetate and 3,20-bis(ethylenedioxy)-Δ$^5$-pregnene-17α,19-diol 17,19-diacetate, respectively.

A solution of 1 gram of 3,17-bis(ethylenedioxy)-Δ$^5$-androsten-19-ol 19-acetate in 100 cc. of methanol was refluxed for 3 hours with 1 gram of potassium hydroxide dissolved in 3 cc. of water. Following this reaction period the reaction mixture was poured into ice water and the thus-formed precipitate collected by filtration, washed with water until neutral and then dried, thus giving a crude compound which, upon recrystallization from methylene chloride/diethyl ether, yielded 3,17-bis(ethylenedioxy)-Δ$^5$-androsten-19-ol.

Similarly, by repeating this procedure using the remaining 19-acetate-3-ketals prepared as described herein-above as the steroid starting materials, 3-ethylenedioxy - 17α - methyl - Δ$^5$ - androstene - 17β,19 - diol; 3-ethylenedioxy - 17α - ethynyl - Δ$^5$ - androstene - 17β,19-diol; 3,20 - bis(ethylenedioxy) - Δ$^5$ - pregnen - 19 - ol and 3,20 - bis(ethylenedioxy) - Δ$^5$ - pregnene - 17α,19-diol 17-acetate, respectively, were obtained.

EXAMPLE I

To a solution of 100 grams of Δ$^5$-androstene-3β,19-diol-17-one in 2000 ml. of anhydrous benzene there were added 1.1 equivalents of dry lead tetraacetate and 100 grams of calcium carbonate. The resulting reaction mixture was refluxed for 30 minutes, following which it was filtered and the filter cake washed with benzene. The filtrate and the benzene washings were then combined and concentrated under vacuum to give a mixture of Δ$^{5(10)}$-estrene-3β,6α-diol-17-one 6-acetate and Δ$^{5(10)}$-estrene-3β,6β-diol-17-one 6-acetate.

By repeating this procedure in every detail but one, namely, replacing Δ$^5$-androstene-3β,19-diol-17-one as the steroid starting material with 17α-methyl-Δ$^5$-androstene-3β,17β,19-triol,
17α-ethyl-Δ$^5$-androstene-3β,17β,19-triol,
17α-vinyl-Δ$^5$-androstene-3β,17β,19-triol,
17α-ethynyl-Δ$^5$-androstene-3β,17β,19-triol,
Δ$^5$-pregnene-3β,19-diol-20-one,
Δ$^5$-pregnene-3β,17α,19-triol-20-one and
Δ$^5$-pregnene-3β,17α,19-triol-20-one 17-acetate, respectively, the corresponding Δ$^{5(10)}$-3β,6α-diol 6-acetates and Δ$^{5(10)}$-3β,6β-diol 6-acetates, namely, 17α-methyl-Δ$^{5(10)}$-estrene-3β,6α,17β-triol 6-acetate and
17α-methyl-Δ$^{5(10)}$-estrene-3β,6β,17β-triol 6-acetate;
17α-ethyl-Δ$^{5(10)}$-estrene-3β,6α,17β-triol 6-acetate and
17α-ethyl-Δ$^{5(10)}$-estrene-3β,6β,17β-triol 6-acetate;
17α-vinyl-Δ$^{5(10)}$-estrene-3β,6α,17β-triol 6-acetate and
17α-vinyl-Δ$^{5(10)}$-estrene-3β,6β,17β-triol 6-acetate,
17α-ethynyl-Δ$^{5(10)}$-estrene-3β,6α,17β-triol 6-acetate and
17α-ethynyl-Δ$^{5(10)}$-estrene-3β,6β,17β-triol 6-acetate;
19-nor-Δ$^{5(10)}$-pregnene-3β,6α-diol-20-one 6-acetate and
19-nor-Δ$^{5(10)}$-pregnene-3β,6β-diol-20-one 6-acetate;
19-nor-Δ$^{5(10)}$-pregnene-3β,6α,17α-triol-20-one 6-acetate and
19-nor-Δ$^{5(10)}$-pregnene-3β,6β,17α-triol-20-one 6-acetate,
and
19-nor-Δ$^{5(10)}$-pregnene-3β,6α,17α-triol-20-one 6,17-diacetate and
19-nor-Δ$^{5(10)}$-pregnene-3β,6β,17α-triol-20-one 6,17-diacetate, respectively, were obtained.

EXAMPLE II

Ten grams of the mixture of Δ$^{5(10)}$-estrene-3β,6α-diol-17-one 6-acetate and Δ$^{5(10)}$-estren-3β,6β-diol-17-one 6-acetate obtained as described in Example I hereinabove was dissolved in 500 ml. of acetone, placed under a nitrogen atmosphere, and cooled to 0° C. Next, an 8 N chromic acid solution (prepared by mixing 26 grams of chromium trioxide with 23 cc. of concentrated sulfuric acid and diluting with water to 100 cc.) was added, with stirring, until the color of the reagent persisted in the reaction mixture. At this point, the reaction mixture was stirred for an additional 5 minutes at 0–5° C., and then poured into 3 liters of water. The resulting mixture was extracted with methylene dichloride, and the extract was washed with water, dried over anhydrous sodium sulfate, and concentrated to dryness under reduced pressure, thus giving a crude product which was recrystallized from acetone/hexane to give a mixture of pure Δ$^{5(10)}$-estren-6α-ol-3,17-dione 6-acetate and Δ$^{5(10)}$-estren-6β-ol-3,17-dione 6-acetate.

This procedure was then repeated in every detail but one, namely, the steroid starting materials used were the remaining mixtures of Δ$^{5(10)}$-estrene-3β,6-diol 6-acetates and 19-nor-Δ$^{5(10)}$-pregnene-3β,6-diol 6-acetates obtained as described in Example I and Preparation E hereinabove. In every case, the corresponding Δ$^{5(10)}$-estren-6-ol-3-one 6-acetates and 19-nor-Δ$^{5(10)}$-pregnen-6-ol-3-one 6-acetates, namely, Δ$^{5(10)}$-estrene-6α,17β-diol-3-one 6,17-diacetate and
Δ$^{5(10)}$-estrene-6β,17β-diol-3-one 6,17-diacetate;
17α-methyl-Δ$^{5(10)}$-estrene-6α,17β-diol-3-one 6-acetate and
17α-methyl-Δ$^{5(10)}$-estrene-6β,17β-diol-3-one 6-acetate;
17α-ethyl-Δ$^{5(10)}$-estrene-6α,17β-diol-3-one 6-acetate and
17α-ethyl-Δ$^{5(10)}$-estrene-6β,17β-diol-3-one 6-acetate;
17α-vinyl-Δ$^{5(10)}$-estrene-6α,17β-diol-3-one 6-acetate and
17α-vinyl-Δ$^{5(10)}$-estrene-6β,17β-diol-3-one 6-acetate;
17α-ethynyl-Δ$^{5(10)}$-estrene-6α,17β-diol-3-one 6-acetate and
17α-ethynyl-Δ$^{5(10)}$-estrene-6β,17β-diol-3-one 6-acetate;
19-nor-Δ$^{5(10)}$-pregnen-6α-ol-3,20-dione 6-acetate and
19-nor-Δ$^{5(10)}$-pregnen-6β-ol-3,20-dione 6-acetate;
19-nor-Δ$^{5(10)}$-pregnene-6α,17α-diol-3,20-dione 6-acetate and
19-nor-Δ$^{5(10)}$-pregnene-6β,17α-diol-3,20-dione 6-acetate;
19-nor-Δ$^{5(10)}$-pregnene-6α,17α-diol-3,20-dione 6,17-diacetate and
19-nor-Δ$^{5(10)}$-pregnene-6β,17α-diol-3,20-dione 6,17-diacetate, and 19-nor-Δ$^{5(10)}$-pregnene-6α,20ε-diol-3-one 6,20-diacetate and
19-nor-Δ$^{5(10)}$-pregnene-6β,20ε-diol-3-one 6,20-diacetate,
respectively, were obtained.

EXAMPLE III

The mixture of Δ$^{5(10)}$-estren-6α-ol-3,17-dione 6-acetate and Δ$^{5(10)}$-estren-6β-ol-3,17-dione 6-acetate obtained as described in Example II hereinabove was separated chromatographically, using neutral alumina, into its individual isomers.

Using the same chromatographic procedure, the remaining mixtures of Δ$^{5(10)}$-estren-6-ol-3-one 6-acetates and 19-nor-Δ$^{5(10)}$-pregnen-6-ol-3-one 6-acetates obtained as described in Example II were also separated into the individual isomers.

EXAMPLE IV

A solution of 1 gram of a mixture of Δ$^{5(10)}$-estren-6α-ol-3,17-dione 6-acetate and Δ$^{5(10)}$-estren-6β-ol-3,17-dione 6-acetate (obtained as described in Example II hereinabove) in 50 cc. of methanol was refluxed for 3 hours with 500 mg. of potassium hydroxide dissolved in 1 cc. of water. Following this reaction period the reaction mixture was poured into ice water, and the thus-formed precipitate was collected by filtration, washed with water until neutral and then dried. The thus-obtained crude compound was then recrystallized from methylene chloride/diethyl ether to give a mixture of pure Δ$^{5(10)}$-estren-6α-ol-3,17-dione and Δ$^{5(10)}$-estren-6β-ol-3,17-dione which, when separated chromatographically in the manner described in Example III hereinabove, gave the individual isomers.

By repeating this procedure using the remaining Δ$^{5(10)}$-estren-6-ol-3-one 6-acetates and 19-nor-Δ$^{5(10)}$-pregnen-6-ol-3-one 6-acetates which were obtained as described in Example II hereinabove and separated chromatographically as described in Example III hereinabove, the corresponding Δ$^{5(10)}$-estren-6-ol-3-ones and 19-nor-Δ$^{5(10)}$-pregnen-6-ol-3-ones, namely, Δ$^{5(10)}$-estrene-6α,17β-diol-3-one,
Δ$^{5(10)}$-estrene-6β,17β-diol-3-one,
17α-methyl-Δ$^{5(10)}$-estrene-6α,17β-diol-3-one 17-acetate,
17α-methyl-Δ$^{5(10)}$-estrene-6β,17β-diol-3-one 17-acetate,
17α-ethyl-Δ$^{5(10)}$-estrene-6α,17β-diol-3-one,
17α-ethyl-Δ$^{5(10)}$-estrene-6β,17β-diol-3-one,
17α-vinyl-Δ$^{5(10)}$-estrene-6α,17β-diol-3-one,
17α-vinyl-Δ$^{5(10)}$-estrene-6β,17β-diol-3-one,
17α-ethynyl-Δ$^{5(10)}$-estrene-6α,17β-diol-3-one,
17α-ethynyl-Δ$^{5(10)}$-estrene-6β,17β-diol-3-one,
19-nor-Δ$^{5(10)}$-pregnen-6α-ol-3,20-dione,
19-nor-Δ$^{5(10)}$-pregnen-6β-ol-3,20-dione,
19-nor-Δ$^{5(10)}$-pregnene-6α,17β-diol-3,20-dione,
19-nor-Δ$^{5(10)}$-pregnene-6β,17β-diol-3,20-dione,
19-nor-Δ$^{5(10)}$-pregnene-6α,17β-diol-3,20-dione 17-acetate,
19-nor-Δ$^{5(10)}$-pregnene-6β,17β-diol-3,20-dione 17-acetate,
19-nor-Δ$^{5(10)}$-pregnene-6α,20ε-diol-3-one and
19-nor-Δ$^{5(10)}$-pregnene-6β,20ε-diol-3-one respectively, were obtained.

EXAMPLE V

A mixture of 2 grams of Δ$^{5(10)}$-estren-6α-ol-3,17-dione, 8 cc. of pyridine and 2 cc. of benzoyl chloride was heated on a steam bath for 1 hour, then poured into ice water. The thus-formed precipitate was collected by filtration, washed with water and dried. Recrystallization from methylene chloride/hexane gave Δ$^{5(10)}$-estren-6α-ol-3,17-dione 6-benzoate.

EXAMPLE VI

A solution of 10 grams of Δ$^{5(10)}$-estren-6α-ol-3,17-dione in 100 ml. of acetone containing 1 gram of sulfuric acid was refluxed for 3 hours. Following this reaction period the reaction mixture was cooled to room temperature and diluted with ten times its volume of water. The resulting precipitate was collected by filtration, washed with water and dried. Crystallization from methanol gave estrone.

This procedure was then repeated in every detail except for the following. First of all, Δ$^{5(10)}$-estren-6α-ol-3,17-dione was replaced by Δ$^{5(10)}$-estren-6β-ol-3,17-dione,
Δ$^{5(10)}$-estrene-6β,17β-diol-3-one 6-acetate,
17α-ethynyl-Δ$^{5(10)}$-estrene-6α,-17β-diol-3-one,
19-nor-Δ$^{5(10)}$-pregnen-6α-ol-3,20-dione,
19-nor-Δ$^{5(10)}$-pregnene-6β,17α-diol-3,20-dione 17-acetate,
19-nor-Δ$^{5(10)}$-pregnene-6α,20ε-diol-3-one,
16α-methyl-19-norΔ$^{5(10)}$-pregnene-6α,17α-diol-3,20-dione 6,17-diacetate (prepared by using 16α-methyl-Δ$^5$-pregnene-3β,17α,19-triol-20-one 17-acetate as the starting material for the procedure of Example I hereinabove and then carrying out the procedures of Examples II and III), 16α,17α-isopropylidenedioxy-19-nor-Δ$^{5(10)}$-pregnen-6β-ol-3,20-dione 6-acetate (prepared by using 16α,17α-isopropylidenedioxy-Δ$^5$-pregnene-3β,19-diol-20-one as the starting material for the procedure of Example I hereinabove and then carrying out the procedures of Examples II and III) and 17,20;20,21 - bismethylenedioxy-19-nor-Δ$^{5(10)}$ pregnen-6α-ol-3,11-dione 6-acetate (prepared by using 17,20;20,21 - bismethylenedioxy-Δ$^5$-pregnene-3β,19-diol-11-one as the starting material for the procedure of Example I hereinabove and then carrying out the procedures of Example II and III), respectively.

Secondly, when using the first four of these Δ$^{5(10)}$-6-ol-3-ones, sulfuric acid was replaced by equivalent amounts of p-toluenesulfonic acid, hydrochloric acid, phosphoric acid and acetic acid, while acetone was replaced by diethyl ether, dioxane, tetrahydrofuran and methyl ethyl ketone.

In every case, the corresponding ring A aromatic steroid, i.e., estrone, estradiol,
17α-methylestradiol,
17α-ethynylestradiol,
19-nor-Δ$^{1,3,5(10)}$-pregnatrien-3-ol-20-one,
19-nor-Δ$^{1,3,5(10)}$-pregnatriene-3,17α-diol-20-one 17-acetate,
19-nor-Δ$^{1,3,5(10)}$-pregnatriene-3,20ε-diol,
16α-methyl-19-nor-Δ$^{1,3,5(10)}$-pregnatriene-3,17α-diol - 20-one 17-acetate,
16α,17α - isopropylidenedioxy - 19-nor-Δ$^{1,3,5(10)}$-pregnatrien-3-ol-20-one and
17,20;20,21 - bismethylenedioxy - 19-nor-Δ$^{1,3,5(10)}$-pregnatrien-3-ol-11-one, respectively, was obtained.

EXAMPLE VII

A solution of 100 grams of Δ$^{5(10)}$-estren-6α-ol-3,17-dione 6-acetate, 250 ml. of absolute ethanol, 50 ml. of ethyl orthoformate and 2 ml. of concentrated sulfuric acid was heated at 70° C., with stirring and under anhydrous conditions, for 3.5 hours. Following this reaction period the reaction mixture was poured into 1 liter of an aqueous 5% sodium bicarbonate solution, then extracted with hexane containing 2% by volume of pyridine. The resulting extract was dried over anhydrous sodium sulfate and then evaporated to dryness under vacuum. Recrystallization from methanol containing 1% v/v of pyridine gave the 17-diethyl ketal of estrone 3-ethyl ether.

By repeating this procedure in every detail but one, namely, replacing ethyl orthoformate with 2,2'-dimethoxypropane, estrone 3-methyl ether was obtained.

EXAMPLE VIII

A solution of 2 grams of Δ$^{5(10)}$-estren-6α-ol-3,17-dione 6-acetate in 20 ml. of acetic anhydride, containing 100 mg. of p-toluenesulfonic acid, was heated at 60° C. for three hours. Following this reaction period the reaction mixture was poured into 300 ml. of ice water and stirred for 2 hours. The oil obtained was extracted with methylene chloride and the extract was washed with water until neutral and then concentrated to dryness under vacuum. Crystallization of the residue from acetone/hexane gave $\Delta^{1,3,5(10),16}$-estratetraene-3,17-diol 3,17-diacetate.

A solution of 1 gram of the thus-obtained estratetraene diacetate in 50 cc. of methanol, containing 500 mg. of potassium hydroxide dissolved in 1 cc. of water, was refluxed for 3 hours. Following this reaction period the reaction mixture was poured into ice water and the resulting precipitate collected by filtration, washed with water until neutral and then dried, thus giving a crude compound which, upon recrystallization from methylene chloride/diethyl ether gave estrone.

This procedure was then repeated in every detail with these exceptions -$\Delta^{5(10)}$-estren-6α-ol-3,17-dione 6-acetate was replaced by $\Delta^{5(10)}$-estrene-6β-17β-diol-3-one 6-acetate as the steroid starting material, and isopropenyl acetate was used in place of acetic anhydride. A good yield of estradiol was obtained.

EXAMPLE IX

A solution of 100 grams of $\Delta^{5(10)}$-estren-6β-ol-3,17-dione in 100 ml. of methanol containing 1 gram of p-toluenesulfonic acid was refluxed for 3 hours. Following this reaction period the reaction mixture was cooled to room temperature and diluted with 10 times its volume of water.

The resulting precipitate was collected by filtration, washed with water and dried. Crystallization from acetone/hexane gave estrone 3-methyl ether.

This procedure was repeated in every detail except for the following. A mixture of $\Delta^{5(10)}$-estren-6α-ol-3,17-dione 17-acetate and $\Delta^{5(10)}$-estren-6β-ol-3,17-dione 17-acetate was used as the steroid starting material, and methanol was replaced by ethanol. The product obtained was estrone 3-ethyl ether.

EXAMPLE X

To 100 grams of 3,17-bis(ethylenedioxy)-$\Delta^5$-androsten-19-ol in 2 liters of benzene there were added 180 grams of lead tetraacetate and 100 grams of calcium carbonate. The resulting reaction mixture was refluxed for 20 minutes, then filtered. Concentration of the filtrate to dryness gave a mixture of crude 3,17-bis(ethylenedioxy)-$\Delta^{5(10)}$-estren-6α-ol 6-acetate and 3,17-bis(ethylenedioxy)-$\Delta^{5(10)}$-estren-6β-ol 6-acetate, which was suitable for use as such in preparing ring A-aromatic steroids.

A portion of this mixture, when chromatographed on neutral alumina gave the individual 6α-ol and 6β-ol isomers.

Similarly, by repeating this procedure in every detail but one, i.e., using 3-ethylenedioxy-17α-methyl-$\Delta^5$-androstene-17β,19-diol;
3-ethylenedioxy-17α-ethynyl-$\Delta^5$-androstene-17β,19-diol;
3,20-bis(ethylenedioxy)-$\Delta^5$-pregnen-19-ol and
3,20-bis(ethylenedioxy)-$\Delta^5$-pregnene-17α,19-diol 17-acetate, respectively in place of 3,17-bis(ethylenedioxy)-$\Delta^5$-androsten-19-ol, mixtures of the corresponding $\Delta^{5(10)}$-estren-6α- and 6β-ol acetates, namely, 3-ethylenedioxy-17α-methyl-$\Delta^{5(10)}$-estrene-6α,17β-diol 6-acetate and
3-ethylenedioxy-17α-methyl-$\Delta^{5(10)}$-estrene-6β,17β-diol 6-acetate;
3-ethylenedioxy-17α-ethynyl-$\Delta^{5(10)}$-estrene-6α,17β-diol-6-acetate and
3-ethylenedioxy-17α-ethynyl-$\Delta^{5(10)}$-estrene-6β,17β-diol 6-acetate;
3,20-bis(ethylenedioxy)-19-nor-$\Delta^{5(10)}$-pregnen-6α-ol 6-acetate and
3,20-bis(ethylenedioxy)-19-nor-$\Delta^{5(10)}$-pregnen-6β-ol 6-acetate, and
3,20-bis(ethylenedioxy)-19-nor-$\Delta^{5(10)}$-pregnene-6α,17α-diol 6,17-diacetate and
3,20-bis(ethylenedioxy)-19-nor-$\Delta^{5(10)}$-pregnene-6β,17α-diol 6,17-diacetate, respectively, were obtained, and portions of these mixtures wer then chromatographed on neutral alumina to give the individual 6α- and 6β-ol isomers.

EXAMPLE XI

One gram of the mixture of crude 3,17-bis(ethylenedioxy)-$\Delta^{5(10)}$-estren-6α-ol-6-acetate and 3,17-bis(ethylenedioxy)-$\Delta^{5(10)}$-estren-6β-ol 6-acetate obtained as described in Example X hereinabove was suspended in 60 cc. of methanol and then admixed with a solution of 1 gram of potassium carbonate in 6 cc. of water. The resulting reaction mixture refluxed for one hour, following which it was cooled in ice and then diluted with water. The resulting precipitate was collected by filtration and recrystallized from acetone/hexane to give a mixture of 3,17 - bis(ethylenedioxy)-$\Delta^{5(10)}$-estren-6α-ol and 3,17-bis (ethylenedioxy)-$\Delta^{5(10)}$-estren-6β-ol, a portion of which, upon chromatography on neutral alumina, was separated into the individual 6α-ol and 6β-ol isomers.

EXAMPLE XII

Ten Grams of 3,17-bis(ethylenedioxy)-$\Delta^{5(10)}$-estren-6α-ol 6-acetate were dissolved in 150 ml. of aqueous 50% acetic acid containing 5 ml. of hydrochloric acid, and the resulting reaction mixture was heated on a steam bath for 1 hour. Following this reaction period the reaction mixture was poured into 10 times its volume of water and the resulting precipitate was collected by filtration, washed with water and dried. Crystallization from methanol gave estrone.

By repeating this procedure in every detail but one, namely, replacing 3,17-bis(ethylenedioxy)-$\Delta^{5(10)}$-estren-6α-ol 6-acetate with 3,17-bis(ethylenedioxy)-$\Delta^{5(10)}$-estren-6β-ol 6-acetate,
3-ethylenedioxy-17α-methyl-$\Delta^{5(10)}$-estrene-6α,17β-diol,
3-ethylenedioxy-17α-ethynyl-$\Delta^{5(10)}$-estrene-6β,17β-diol,
3,20-bis(ethylenedioxy)-$\Delta^{5(10)}$pregnen-6α-ol and
3,20 - bis(ethylenedioxy)-$\Delta^{5(10)}$-pregnene-6β,17α-diol 17-acetate, respectively, the corresponding ring A aromatic steroids, i.e., estrone, 17α-methylestradiol, 17α-ethynylestradiol, 19-nor-$\Delta^{1,3,5(10)}$-pregnatriene - 3,20-dione and 19-nor-$\Delta^{1,3,5(10)}$-pregnatrien-17α-ol-3,20 - dione respectively, were obtained.

It will be obvious to those skilled in the art that other changes and variations can be made in carrying out the present invention without departing from the spirit and scope thereof as defined in the appended claims.

I claim:

1. A compound represented by the general formula:

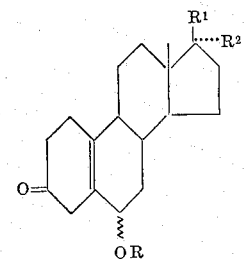

wherein R is selected from the group consisting of hydrogen and an acyl group containing less than 12 carbon atoms; $R^1$ is selected from the group consisting of hydroxyl and an acyloxy group containing less than 12 carbon atoms; $R^2$ is selected from the group consisting of hydrogen, a lower alkyl group, a lower alkenyl group and a lower alkylnyl group, and $R^1$ and $R^2$ taken together represent a keto group.

2. $\Delta^{5(10)}$-estren-6-ol-3,17-dione.
3. $\Delta^{5(10)}$-estren-6-ol-3,17-dione 6-acetate.
4. $\Delta^{5(10)}$-estrene-6,17β-diol-3-one.
5. $\Delta^{5(10)}$-estrene-6,17β-diol-3-one 6,17-diacetate.
6. 17α-methyl-$\Delta^{5(10)}$-estrene-6,17β-diol-3-one 6-acetate.
7. 17α-ethyl-$\Delta^{5(10)}$-estrene-6,17β-diol-3-one 6-acetate.

8. 17α-vinyl-Δ⁵⁽¹⁰⁾-estrene-6,17β-diol-3-one 6-acetate.
9. 17α-ethynyl-Δ⁵⁽¹⁰⁾-estrene-6,17β-diol-3-one 6-acetate.
10. A compound represented by the general formula:

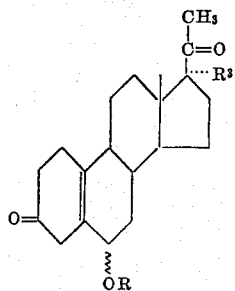

wherein R is selected from the group consisting of hydrogen and an acyl group containing less than 12 carbon atoms and R³ is selected from the group consisting of hydrogen, a hydroxyl group and an acyloxy group containing less than 12 carbon atoms.

11. 19-nor-Δ⁵⁽¹⁰⁾-pregnen-6-ol-3,20-dione 6-acetate.
12. 19-nor-Δ⁵⁽¹⁰⁾-pregnene-6,17α-diol-3,20-dione 6,17-diacetate.

13. A process for the preparation of a Δ¹,³,⁵⁽¹⁰⁾-steroid substituted at the 3-position with a member selected from the group consisting of a hydroxyl group, a lower alkoxy group and an acyloxy group containing less than 12 carbon atoms which comprises reacting a Δ⁵⁽¹⁰⁾-steroid represented by the partial formula:

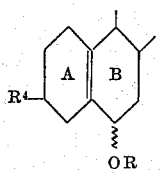

wherein R is selected from the group consisting of hydrogen and an acyl group containing less than 12 carbon atoms and R⁴ is selected from the group consisting of a keto group and a ketalized keto group, in the presence of a catalytic amount of a proton donor.

14. A process for the preparation of a Δ¹,³,⁵⁽¹⁰⁾-steroid substituted at the 3-position with a hydroxyl group which comprises reacting a Δ⁵⁽¹⁰⁾-steroid represented by the partial formula:

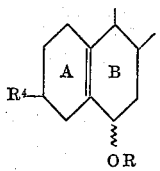

wherein R is selected from the group consisting of hydrogen and an acyl group containing less than 12 carbon atoms and R⁴ is selected from the group consisting of a keto group and a ketalized keto group, in water, in the presence of a catalytic amount of a proton donor.

15. A process for the preparation of a Δ¹,³,⁵⁽¹⁰⁾-steroid substituted at the 3-position with a hydroxyl group which comprises reacting a Δ⁵⁽¹⁰⁾-steroid represented by the partial formula:

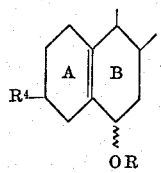

wherein R is selected from the group consisting of hydrogen and an acyl group containing less than 12 carbon atoms and R⁴ is selected from the group consisting of a keto group and a ketalized keto group, in an inert organic solvent, in the presence of a catalytic amount of a proton donor.

16. A process for the preparation of a Δ¹,³,⁵⁽¹⁰⁾-steroid substituted at the 3-position with a lower alkoxy group which comprises reacting a Δ⁵⁽¹⁰⁾-steroid represented by the partial formula:

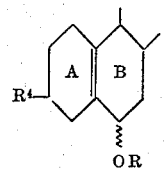

wherein R is selected from the group consisting of hydrogen and an acyl group containing less than 12 carbon atoms and R⁴ is selected from the group consisting of a keto group and a ketalized keto group, in a lower alkanol, in the presence of a catalytic amount of a proton donor.

17. A process for the preparation of a Δ¹,³,⁵⁽¹⁰⁾-steroid substituted at the 3-position with a lower alkoxy group which comprises reacting a Δ⁵⁽¹⁰⁾-steroid represented by the partial formula:

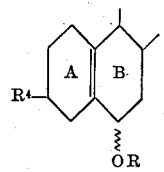

wherein R is selected from the group consisting of hydrogen and an acyl group containing less than 12 carbon atoms and R⁴ is selected from the group consisting of a keto group and a ketalized keto group, in a substance which, in acid medium, provides a lower alkanol, in the presence of a catalytic amount of a proton donor.

18. A process for the preparation of a Δ¹,³,⁵⁽¹⁰⁾-steroid substituted at the 3-position with a lower alkoxy group which comprises reacting a Δ⁵⁽¹⁰⁾-steroid represented by the partial formula:

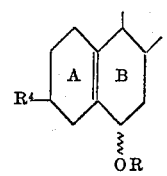

wherein R is selected from the group consisting of hydrogen and an acyl group containing less than 12 carbon atoms and R⁴ is selected from the group consisting of a keto group and a ketalized keto group, in a lower alkyl orthoformate, in the presence of a catalytic amount of a proton donor.

19. A process for the preparation of a Δ¹,³,⁵⁽¹⁰⁾-steroid substituted at the 3-position with a lower alkoxy group which comprises reacting a Δ⁵⁽¹⁰⁾-steroid represented by the partial formula:

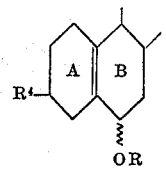

wherein R is selected from the group consisting of hydrogen and an acyl group containing less than 12 carbon atoms and R⁴ is selected from the group consisting of a keto group and a ketalized keto group, in a lower alkane containing at least three carbon atoms which is substituted on a non-terminal carbon atom thereof with two lower alkoxy groups, in the presence of a catalytic amount of a proton donor.

20. A process for the preparation of a Δ¹,³,⁵⁽¹⁰⁾-steroid substituted at the 3-position with an acyloxy group containing less than 12 carbon atoms, which comprises reacting a $\Delta^{5(10)}$-steroid represented by the partial formula:

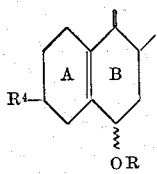

wherein R is selected from the group consisting of hydrogen and an acyl group containing less than 12 carbon atoms and $R^4$ is selected from the group consisting of a keto group and a ketalized keto group, in an anhydride of an organic carboxylic acid containing less than 12 carbon atoms, in the presence of a catalytic amount of a proton donor.

21. A process for the preparation of a $\Delta^{1,3,5(10)}$-steroid substituted at the 3-position with an acyloxy group containing less than 12 carbon atoms which comprises reacting a $\Delta^{5(10)}$-steroid represented by the partial formula:

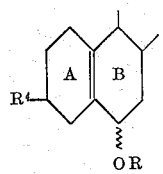

wherein R is selected from the group consisting of hydrogen and an acyl group containing less than 12 carbon atom and $R^4$ is selected from the group consisting of a keto group and a ketalized group, in an enol ester of an organic carboxylic acid containing less than 12 carbon atoms with a lower alkanone, in the presence of a catalytic amount of a proton donor.

22. A process for the preparation of estrone which comprises reacting $\Delta^{5(10)}$-estren-6-ol-3,17-dione 6-acetate in acetone in the presence of a catalytic amount of a proton donor.

23. A process for the preparation of 17α-ethynylestradiol which comprises reacting 17-ethynyl-$\Delta^{5(10)}$-estrene-6,17β-diol-3-one in acetone in the presence of a catalytic amount of a proton donor.

24. A process for the preparation of 19-nor-$\Delta^{1,3,5(10)}$-pregnatrien-3-ol-20-one which comprises reacting 19-nor-$\Delta^{5(10)}$-pregnen-6-ol-3,20-dione in acetone in the presence of a catalytic amount of a proton donor.

25. A process for the preparation of estrone-3-methyl ether which comprises reacting $\Delta^{5(10)}$-estren-6-ol-3,17-dione 6-acetate in methanol in the presence of a catalytic amount of a proton donor.

26. A process for the preparation of the 17-diethyl ketal of estrone 3-ethyl ether which comprises reacting $\Delta^{5(10)}$-estrene-6-ol-3,17-dione 6-acetate in ethyl orthoformate in the presence of a catalytic amount of a proton donor.

27. A process for the preparation of estrone 3-methyl ether which comprises reacting $\Delta^{5(10)}$-estren-6-ol-3,17-dione 6-acetate in 2,2-dimethoxypropane in the presence of a catalytic amount of a proton donor.

28. A process for the preparation of estrone which comprises reacting 3,17-bis(ethylenedioxy)-$\Delta^{5(10)}$-estren-6-ol-6-acetate in water in the presence of a catalytic amount of a proton donor.

References Cited by the Examiner
UNITED STATES PATENTS 3,178,419  4/1965  Jeger et al. _____ 260—239.55

OTHER REFERENCES

Amorosa, et al.: Helv. Chim. Acta, vol. 45, pp. 2674–2698 (1962), p. 2683 relied on.

LEWIS GOTTS, *Primary Examiner.*

H. A. FRENCH, *Assistant Examiner.*

UNITED STATES PATENT OFFICE
CERTIFICATE OF CORRECTION

Patent No. 3,318,923                          May 9, 1967

Francisco Alvarez

It is hereby certified that error appears in the above numbered patent requiring correction and that the said Letters Patent should read as corrected below.

Column 6, line 8, for "7" read -- 17 --; line 9, for "$\Delta$" read -- $\Delta^5$ --; line 10, for "9" read -- 19 --; line 12, for "one-16" read -- one, 16 --; line 14, for "3β, 19-diol-20-one" read -- 3β, 17α, 19-triol-20-one 17-acetate --; same line 14, for "16β" read -- 16α --; same line 14, strike out "pregnene-3β, 19-"; column 10, line 40, before "α" insert -- 6 --; column 20, line 2, after "17" insert -- α --.

Signed and sealed this 16th day of July 1968.

(SEAL)
Attest:

Edward M. Fletcher, Jr.                      EDWARD J. BRENNER
Attesting Officer                            Commissioner of Patents